United States Patent
Kimura

(10) Patent No.: US 10,337,860 B2
(45) Date of Patent: Jul. 2, 2019

(54) DISTANCE SENSOR INCLUDING ADJUSTABLE FOCUS IMAGING SENSOR

(71) Applicant: Magik Eye Inc., New York, NY (US)

(72) Inventor: Akiteru Kimura, Tokyo (JP)

(73) Assignee: MAGIK EYE INC., New York, NY (US)

( * ) Notice: Subject to any disclaimer, the term of this patent is extended or adjusted under 35 U.S.C. 154(b) by 0 days.

(21) Appl. No.: 15/832,085

(22) Filed: Dec. 5, 2017

(65) Prior Publication Data

US 2018/0156609 A1 Jun. 7, 2018

Related U.S. Application Data

(60) Provisional application No. 62/430,998, filed on Dec. 7, 2016.

(51) Int. Cl.
| | |
|---|---|
| *H04N 5/225* | (2006.01) |
| *G01C 3/08* | (2006.01) |
| *G06T 7/521* | (2017.01) |
| *G06T 7/564* | (2017.01) |

(52) U.S. Cl.
CPC .............. *G01C 3/08* (2013.01); *G06T 7/521* (2017.01); *G06T 7/564* (2017.01); *H04N 5/2256* (2013.01); *G06T 2207/10004* (2013.01); *G06T 2207/30252* (2013.01)

(58) Field of Classification Search
CPC ........... G01C 3/08; G06T 7/564; G06T 7/521; H04N 5/2256
USPC ....................................................... 348/136
See application file for complete search history.

(56) References Cited

U.S. PATENT DOCUMENTS

| | | | |
|---|---|---|---|
| 4,914,460 | A | 4/1990 | Caimi et al. |
| 5,598,299 | A | 1/1997 | Hayakawa |
| 5,730,702 | A | 3/1998 | Tanaka et al. |
| 5,980,454 | A | 11/1999 | Broome |
| 9,686,539 | B1 | 6/2017 | Zuliani et al. |
| 2003/0071891 | A1 | 4/2003 | Geng |

(Continued)

FOREIGN PATENT DOCUMENTS

| | | |
|---|---|---|
| KR | 10-2015-0101749 A | 9/2015 |
| WO | WO 2014/0106843 A2 | 7/2014 |
| WO | WO 2014/131064 | 8/2014 |

OTHER PUBLICATIONS

International Search Report and Written Opinion dated Jul. 2, 2018 in corresponding PCT Application No. PCT/US2017/064681, 13 pages.

*Primary Examiner* — Nguyen T Truong
(74) *Attorney, Agent, or Firm* — Tong, Rea, Bentley & Kim, LLC

(57) ABSTRACT

In one embodiment, a method for calculating a distance to an object includes simultaneously activating a first projection point and a second projection point of a distance sensor to collectively project a reference pattern into a field of view, activating a third projection point of the distance sensor to project a measurement pattern into the field of view, capturing an image of the field of view, wherein the object, the reference pattern, and the measurement pattern are visible in the image, calculating a distance from the distance sensor to the object based on an appearance of the measurement pattern in the image, detecting a movement of a lens of the distance sensor based on an appearance of the reference pattern in the image, and adjusting the distance as calculated based on the movement as detected.

21 Claims, 14 Drawing Sheets

(56) References Cited

U.S. PATENT DOCUMENTS

| | | |
|---|---|---|
| 2006/0055942 A1 | 3/2006 | Krattiger |
| 2006/0290781 A1 | 12/2006 | Hama |
| 2007/0091174 A1 | 4/2007 | Kochi et al. |
| 2007/0165243 A1 | 7/2007 | Kang et al. |
| 2007/0206099 A1 | 9/2007 | Matsuo |
| 2008/0128506 A1 | 6/2008 | Tsikos |
| 2010/0149315 A1 | 6/2010 | Qu et al. |
| 2010/0238416 A1 | 9/2010 | Kuwata |
| 2011/0188054 A1 | 8/2011 | Petronius et al. |
| 2012/0051588 A1 | 3/2012 | Mceldowney |
| 2012/0113252 A1 | 5/2012 | Yang et al. |
| 2012/0225718 A1 | 9/2012 | Zhang |
| 2013/0155417 A1 | 6/2013 | Ohsawa |
| 2013/0242090 A1 | 9/2013 | Yoshikawa |
| 2014/0009571 A1 | 1/2014 | Geng |
| 2014/0036096 A1 | 2/2014 | Sterngren |
| 2014/0071239 A1 | 3/2014 | Yokota |
| 2014/0085429 A1 | 3/2014 | Hérbert et al. |
| 2014/0125813 A1 | 5/2014 | Holz |
| 2014/0207326 A1 | 7/2014 | Murphy |
| 2014/0241614 A1 | 8/2014 | Lee |
| 2014/0275986 A1 | 9/2014 | Vertikov |
| 2014/0320605 A1 | 10/2014 | Johnson |
| 2015/0009301 A1 | 1/2015 | Ribnick et al. |
| 2015/0077764 A1 | 3/2015 | Braker et al. |
| 2015/0171236 A1 | 6/2015 | Murray |
| 2015/0248796 A1 | 9/2015 | Iyer et al. |
| 2015/0268399 A1 | 9/2015 | Futterer |
| 2015/0288956 A1 | 10/2015 | Mallet et al. |
| 2016/0022374 A1 | 1/2016 | Haider |
| 2016/0117561 A1 | 4/2016 | Miyazawa et al. |
| 2016/0128553 A1 | 5/2016 | Geng |
| 2016/0178915 A1 | 6/2016 | Mor et al. |
| 2016/0267682 A1 | 9/2016 | Yamashita |
| 2016/0327385 A1 | 11/2016 | Kimura |
| 2016/0334939 A1 | 11/2016 | Dawson et al. |
| 2016/0350594 A1 | 12/2016 | McDonald |
| 2017/0098305 A1 | 4/2017 | Gossow |
| 2017/0221226 A1 | 8/2017 | Shen et al. |
| 2017/0307544 A1 | 10/2017 | Nagata |

514

DISTANCE SENSOR INCLUDING ADJUSTABLE FOCUS IMAGING SENSOR

CROSS REFERENCE TO RELATED APPLICATIONS

This application claims the benefit of U.S. Provisional Patent Application Ser. No. 62/430,998, filed Dec. 7, 2016, which is herein incorporated by reference in its entirety.

BACKGROUND OF THE DISCLOSURE

The present disclosure relates generally computer vision systems and relates more particularly to sensors for measuring the distance to an object or point in space.

Unmanned vehicles, such as robotic vehicles and drones, typically rely on computer vision systems for obstacle detection and navigation in the surrounding environment. These computer vision systems, in turn, typically rely on various sensors that acquire visual data from the surrounding environment, which the computer vision systems process in order to gather information about the surrounding environment. For instance, data acquired via one or more imaging sensors may be used to determine the distance from the vehicle to a particular object or point in the surrounding environment.

SUMMARY

In one embodiment, a method for calculating a distance to an object includes simultaneously activating a first projection point and a second projection point of a distance sensor to collectively project a reference pattern into a field of view, activating a third projection point of the distance sensor to project a measurement pattern into the field of view, capturing an image of the field of view, wherein the object, the reference pattern, and the measurement pattern are visible in the image, calculating a distance from the distance sensor to the object based on an appearance of the measurement pattern in the image, detecting a movement of a lens of the distance sensor based on an appearance of the reference pattern in the image, and adjusting the distance as calculated based on the movement as detected.

In another embodiment, a computer-readable storage device stores a plurality of instructions which, when executed by a processor, cause the processor to perform operations for calculating a distance to an object. The operations include simultaneously activating a first projection point and a second projection point of a distance sensor to collectively project a reference pattern into a field of view, activating a third projection point of the distance sensor to project a measurement pattern into the field of view, capturing an image of the field of view, wherein the object, the reference pattern, and the measurement pattern are visible in the image, calculating a distance from the distance sensor to the object based on an appearance of the measurement pattern in the image, detecting a movement of a lens of the distance sensor based on an appearance of the reference pattern in the image, and adjusting the distance as calculated based on the movement as detected.

In another example, an apparatus includes an imaging sensor including a lens that is movable, a first projection point and a second projection point to collectively project a reference pattern into a field of view, wherein respective positions of the first projection point and the second projection point relative to the imaging sensor are fixed, a third projection point to project a measurement pattern into the field of view, wherein a position of the third projection point relative to the imaging sensor is fixed, and circuitry to calculate a distance from the apparatus an object in the field of view based on an appearance of the measurement pattern in an image of the field of view captured by the imaging sensor, to detect a movement of the lens based on an appearance of the reference pattern in the image, and to adjust the distance as calculated based on the movement as detected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1A:
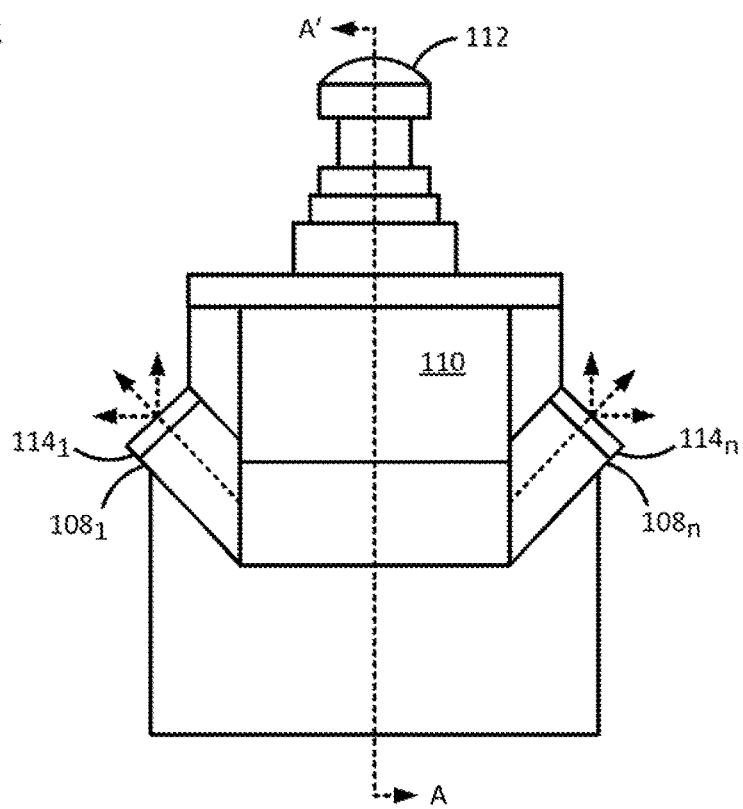
FIG. 1A illustrates a cross-sectional view of one embodiment of a distance sensor that may be used to generate optical configurations of the present disclosure.

In one embodiment, the present disclosure relates to a distance sensor. Distance sensors may be used in unmanned vehicles in order to help a computer vision system determine the distance from the vehicle to a particular object or point in the surrounding environment. For instance, a distance sensor may project one or more beams of light onto the object or point and then compute the distance according to time of flight (TOF), analysis of the reflected light (e.g., lidar), or other means. Conventional distance sensors of this type tend to be bulky, however, and thus may not be suitable for use in compact vehicles. Moreover, the sensors can be very expensive to manufacture and tend to have a limited field of view. For instance, even using an arrangement of multiple conventional imaging sensors provides a field of view that is less than 360 degrees. Distance sensors may also be used for other applications, including three-dimensional (3D) imaging, personal and commercial vehicle camera systems, security systems, and the like. However, each of these applications may require different types of image data (e.g., wide field of view, far distance, small size, etc.); thus, lens shift and image magnification may be used to capture the types of images needed for a given application.

Some distance sensors utilize simple triangulation algorithms to correlate the position of an image directly to distance and thereby calculate the distance to an object associated with the image. Some sensors of this type may use two-dimensional cameras as three-dimensional sensors. Thus, there is an advantage to such systems in terms of cost and size. However, for active triangulation systems that employ beam projection, the imaging sensor (e.g., the camera) is typically configured as a fixed lens, fixed focus system with no zooming capabilities. The fixed focus may introduce blur when attempting to capture images from greater distances, and the inability to zoom may make it difficult to capture clear images of moving objects. On the other hand, if the lens is adjustable for zooming and focusing, any undesirable movement of the lens (e.g., shifting or inclining) may affect triangulation accuracy.

Examples of the disclosure provide optical configuration refinements for a compact distance sensor, such as any of the distance sensors disclosed in U.S. patent application Ser. No. 14/920,246, filed Oct. 22, 2015, which is herein incorporated by reference in its entirety. One or more light sources project a plurality of beams that collectively form a measurement pattern (e.g., a plurality of parallel lines) when incident upon an object. Two or more light sources project a plurality of beams that collectively form a reference pattern (e.g., also a plurality of parallel lines) when incident upon the object. The measurement and reference patterns may be projected simultaneously from the same light sources or from different light sources. One or more imaging sensors then capture two-dimensional images of the object, the measurement pattern, and the reference pattern, and, based on the appearance of the measurement pattern and reference pattern on the object in the images, detect movement (e.g., shift, incline, or the like) of the distance sensor's imaging sensor lens. Compensations can then be made to triangulation-based object distance measurements to account for the lens movement.

Within the context of the present disclosure, a "beam" or "projection beam" refers to a form of light that is emitted by a light source of the disclosed distance sensor. A "line" or "pattern" refers to an image that is created on a surface or object when a beam emitted by a light source is incident upon that surface or object.

Figure 1B:
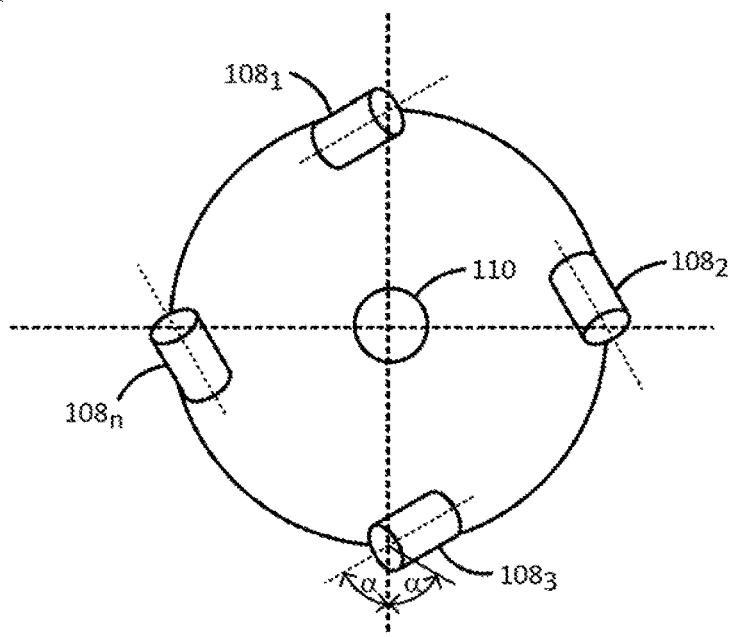
FIG. 1B illustrates a top view of the distance sensor of FIG. 1A.

For instance, FIGS. 1A and 1B illustrate one example of a distance sensor 100 that may be used to generate optical configurations of the present disclosure. In particular, FIG. 1A illustrates a cross-sectional view of the distance sensor 100, while FIG. 1B illustrates a top view of the distance sensor 100 of FIG. 1A. The distance sensor 100 may be mounted, for example, to an unmanned vehicle.

As illustrated in FIG. 1A, the distance sensor 100 comprises a plurality of components arranged within a compact housing 102. In one example, the components include a plurality of light sources $108_1$-$108_n$ (hereinafter collectively referred to as "light sources 108" or individually referred to as a "light source 108") arranged around an imaging sensor 110 that includes a wide-angle lens 112. In one example, the plurality of light sources 108 comprises an even number of light sources. For instance, in the example depicted in FIG. 1B, the plurality of light sources 108 comprises four light sources 108. In one example, the components are arranged substantially symmetrically about a central axis A-A'. For instance, in one example, the central axis A-A' coincides with the optical axis (e.g., the center of lens unit) of the imaging sensor 110, and the light sources 108 are spaced at regular intervals (e.g., every thirty degrees, every ninety degrees, or the like) in a ring around the imaging sensor 110, as illustrated in FIG. 1B.

In one example, each of the light sources 108 is a laser light source that emits a plurality of beams of light, where the plurality of beams of light may project a plurality of continuous lines or lines of dots (or other markings, such as x's, dashes, or the like) onto a surface upon which the plurality of beams is incident. Accordingly, each light source 108 may be considered a projection point for the distance sensor 100, i.e., a point on the distance sensor 100 from which a plurality of beams of light is projected into the field of view. To this end, each projection point may include a respective diffractive optical element $114_1$-$114_n$ (hereinafter collectively referred to as diffractive optical elements 114" or referred to individually as a "diffractive optical element 114") that splits a single beam of light, emitted by the light source 108, into a plurality of beams of light. Each individual beam of the plurality of beams may in turn project a dot or point onto a surface, where the plurality of beams is arranged so that the corresponding dots collectively form a series of parallel lines. The lines may be formed of dots, so that they collectively form a rectangular matrix of dots. Alternatively, the lines may be continuous, or formed of dashes, x's or the like.

The direction of projection of each light source 108 may be fixed relative to the imaging sensor 110. In one example, each light source 108 is configured to project a plurality of beams that forms a different visual pattern on a surface. For example, light source $108_1$ may project a pattern of dots, while light source $108_2$ may project a pattern of dashes or x's, and so on. In a further example, at least one light source 108 of the plurality of light sources 108 is configurable to vary the pattern it projects. In addition, the intensity of the light projected by one or more of the light sources 108 may vary. For example, light source $108_1$ may project light of a first intensity, while light source $108_2$ may project light of a different second intensity, and so on. Alternatively, each light source 108 may be capable of projecting light whose intensity can be varied within some range.

The light that is emitted from each light source 108 is of a wavelength that is known to be relatively safe to human vision (e.g., infrared). In a further example, each light source 108 may include circuitry to adjust the intensity of its output. In a further example, each light source 108 may emit light in pulses, so as to mitigate the effects of ambient light on image capture.

In one example, the plurality of light sources 108 is positioned "behind" a principal point of the imaging sensor 110 (i.e., the point where the optical axis A-A' intersects the image plane), relative to the direction in which light emitted by the plurality of light sources 108 propagates, as shown in FIG. 1A. In one example, at least one light source 108 of the plurality of light sources 108 is detachable from the distance sensor 100.

As discussed above, the imaging sensor 110 may be positioned along the central axis A-A', in the middle of the plurality of light sources 108. In one example, the imaging sensor 110 is an image capturing device, such as a still or video camera. In one particular example, the image capturing device includes a red, green, blue infrared (RGB-IR) sensor. As also discussed above, the imaging sensor 110 includes a wide-angle lens 112, such as a fisheye lens, that creates a hemispherical field of view. In one example, the lens 112 comprises any type of lens other than a center projection or free form surface optical lens. In one example, the imaging sensor 110 includes circuitry for calculating the distance from the distance sensor 100 to an object or point. In another example, the imaging sensor includes a network interface for communicating captured images over a network to a processor, where the processor calculates the distance from the distance sensor 100 to an object or point and then communicates the calculated distance back to the distance sensor 100.

In another example, the distance sensor 100 may employ a single light source 108 that employs a diffractive optical element to split its beam into a first plurality of beams. Each of the first plurality of beams is then further split into a second plurality of beams that is emitted from each projection point of the distance sensor 100 as discussed above (e.g., by the diffractive optical elements 114). This example is discussed in further detail in U.S. patent application Ser. No. 14/920,246.

Thus, in one example, the distance sensor 100 uses one or more light sources and/or one or more diffractive optical elements to create a plurality of projection points from which a plurality of projection beams is emitted, where the plurality of lines produced by the plurality of projection beams (e.g., which may comprise patterns of dots or dashes) may be orientated parallel to each other on a surface onto which they are projected. Thus, a pattern projected by the distance sensor 100 onto a surface may comprise a plurality of parallel lines, where each of the lines comprises a continuous line or a line of dots, dashes, x's, or the like. The distance from the distance sensor 100 to an object can then be calculated from the appearances of the plurality of parallel lines (e.g., by the positions of the dots, when the lines are formed of dots) in the field of view (e.g., as described in U.S. patent application Ser. No. 14/920,246, filed Oct. 22, 2015). For instance, distance to the object can be detected through the lateral movement of the dots forming the parallel lines, because the lines are always continuously linear even if the distance changes. The size and dimensions of the object can also be directly calculated.

As discussed in further detail below, different patterns of parallel lines may be used to measure distance and to compensate for lens movement. For instance, images of a first and/or a second reference pattern may be used to detect lens movement. Knowledge of the lens movement may then be applied to adjust a distance measurement made (e.g., via triangulation) based on an image of a measurement pattern.

When each of the light sources 108 projects a plurality of lines of a different pattern (e.g., dots, x, dashes, etc.), the circuitry in the imaging sensor 110 can easily determine which lines in a captured image were created by which of the light sources 108. This may facilitate the distance calculations, as discussed in greater detail below. In one example, a different distance calculation technique may be used in conjunction with the patterns projected by each of the light sources 108.

Figure 2:
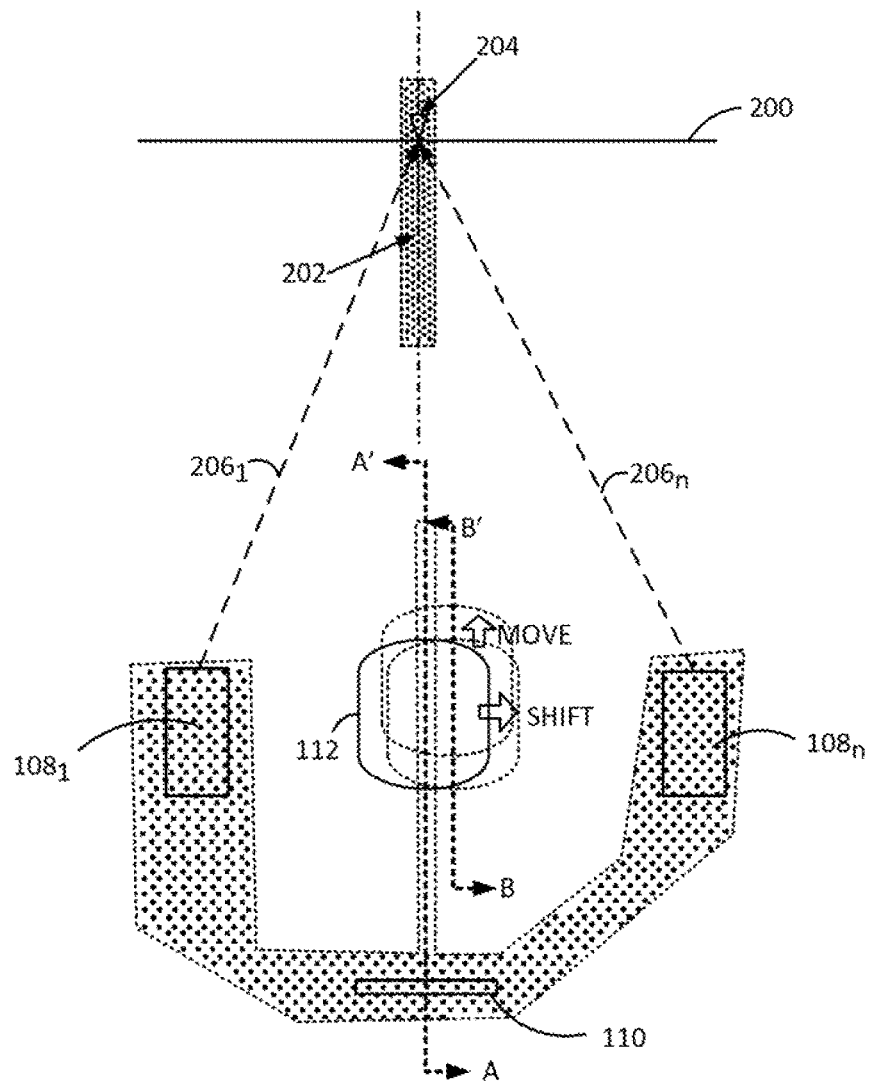
FIG. 2 illustrates a top view of a portion of the distance sensor of FIGS. 1A and 1B.

FIG. 2 illustrates a top view of a portion of the distance sensor 100 of FIGS. 1A and 1B. In particular, FIG. 2 illustrates the concepts of lens shift and image magnification relative to an object 200 being detected.

As illustrated, the imaging sensor 110 and the light sources 108 have fixed positions. However, the lens 112 has a moveable position so that it can be adjusted for focusing and zooming. Thus, although the distance sensor 100 may have a fixed position relative to the object 200 whose distance is being measured, the position of the lens 112 relative to the object 200 may vary, and this may affect the accuracy of the triangulation technique used for distance calculation.

For instance, the lens 112 may shift, i.e., move in a lateral or perpendicular direction relative to the optical axis of the imaging sensor 110. In FIG. 2, the initial, pre-shift optical axis is shown at A-A', while the new, post-shift optical axis is shown at B-B'.

The lens 112 may also move in a direction parallel to the optical axis of the imaging sensor 110, e.g., for the purposes of image magnification (zoom). In this case, the position of the imaging sensor's optical axis does not change (e.g., it remains A-A'), but the distance from the lens 112 to the object 200 changes.

A reference pattern may be projected onto the object 200 by two or more of the light sources 108, where each light source 108 projects a respective reference beam $206_1$ or $206_n$ (hereinafter collectively referred to as "reference beams 206" or referred to individually as a "reference beam 206"). The reference pattern includes at least one reference point 204 (e.g., a dot, dash, line, or the like) where the reference beams 206 converge or intersect, as discussed in further detail below. In one example, a reference axis 202 of the reference pattern is aligned (e.g., collinear) with the optical axis A-A' of the imaging sensor 110.

Figure 3A:
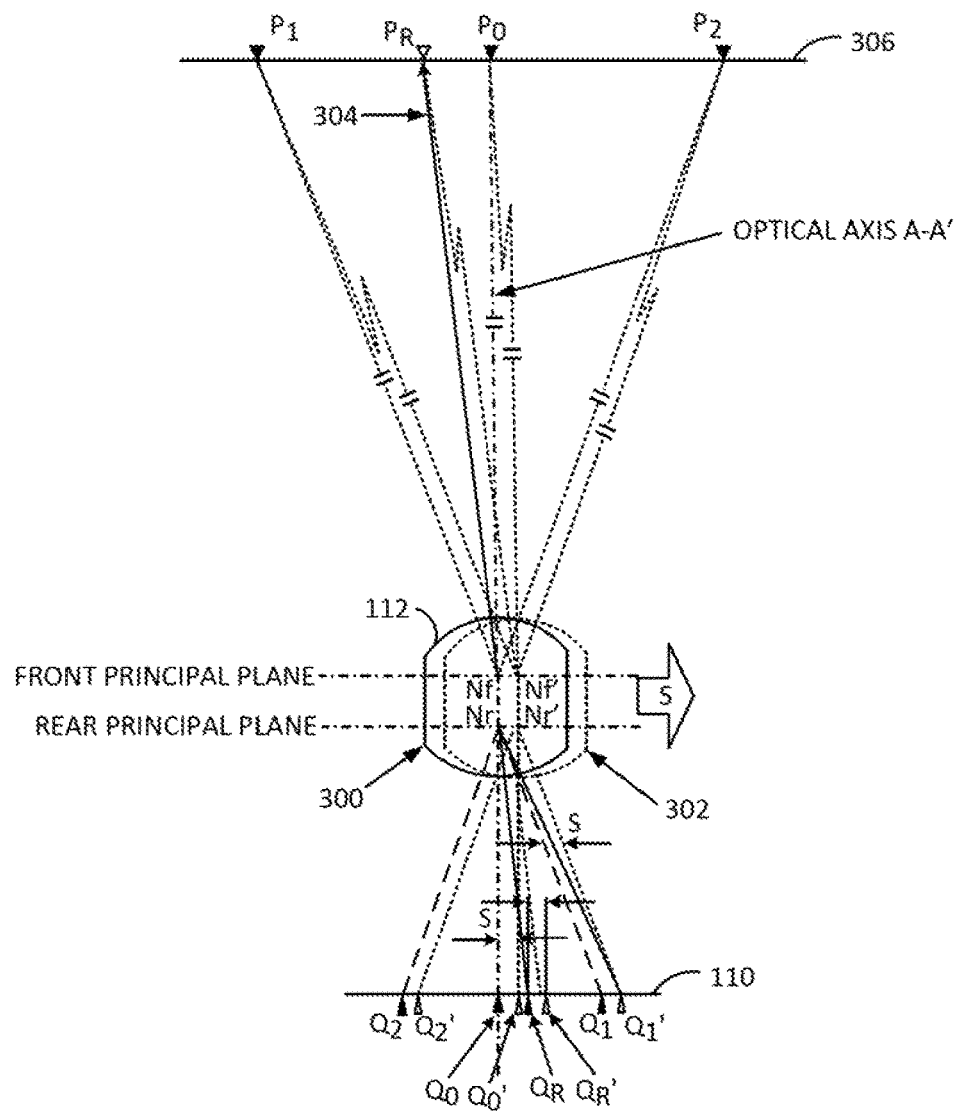
FIG. 3A illustrates a lens shift in more detail.

FIG. 3A illustrates a lens shift in more detail. In particular, FIG. 3A illustrates a lens shift without a change in the distance from the lens to the object 306. In FIG. 3A, the initial position of the lens 112 is indicated at 300, while the new or shifted positon of the lens 112 is indicated at 302. The shift, or the lateral difference between the initial position 300 and the new position 302, may be given as s.

Reference numeral 304 indicates a reference beam that is projected onto the object 306, creating a point (e.g., a dot, x, dash, or the like) image $P_R$, hereinafter referred to as a "reference point," on the object 306. As illustrated, the reference beam 304 is projected from, and passes through, the front nodal point $N_f$ of the lens 112 from the initial position 300 of the lens 112. In this case, the front nodal point $N_f$ serves as a calibration position of the distance sensor 100 for triangulation. When the lens 112 shifts to the new position 302, the front nodal point of the lens 112 moves to $N_f'$. The rear nodal point of the lens 112 moves from $N_r$ to $N_r'$. The direction and the reference point $P_R$ associated with the reference beam 304 are fixed.

When the lens 112 is at the initial position 300, the image of the reference point $P_R$ on the imaging sensor 110 is indicated by $Q_R$. However, when the lens 112 shifts to the new position 302, the image of the reference point $P_R$ on the imaging sensor 110 moves to $Q_R'$. In this case, the moving distance, s', of the reference point $P_R$ may be calculated as:

$$s' = s + s(b/a) \tag{EQN. 1}$$

where b represents the image distance (i.e., the distance from the image $Q_R'$ of the reference point $P_R$ on the image sensor 110 to the rear nodal point $N_r'$ of the lens 112) and a represents the object distance (i.e., the distance from the object 306 to the rear nodal point $N_r'$ of the lens 112).

Typically, the ratio b/a is relatively small, so that the shift s is approximately equal to the moving distance s'.

In one example, dot images $P_0$, $P_1$, and $P_2$ form part of a pattern that is projected onto the object 306 for distance measurement purposes; thus, the dot images $P_0$, $P_1$, and $P_2$ may be referred to herein as "measurement points." The corresponding images of the measurement points on the imaging sensor 110 are indicated by $Q_0$, $Q_1$, and $Q_2$, respectively. When the lens 112 shifts to the new position 302, the images of the measurement points on the imaging sensor 110 move to $Q_0'$, $Q_1'$, and $Q_2'$, respectively. In this case, the moving distances s' of the measurement points $P_0$, $P_1$, and $P_2$ are approximately equal to the shift, s.

Thus, the shift, s, of the lens 112 may be determined by employing the reference beam 304 with any distance to the object 306. When the shift is s, the moving value of the image of any measurement point $P_0$, $P_1$, and $P_2$ (as captured by the imaging sensor 110) at any distance to the object 306 is s'.

Figure 3B:
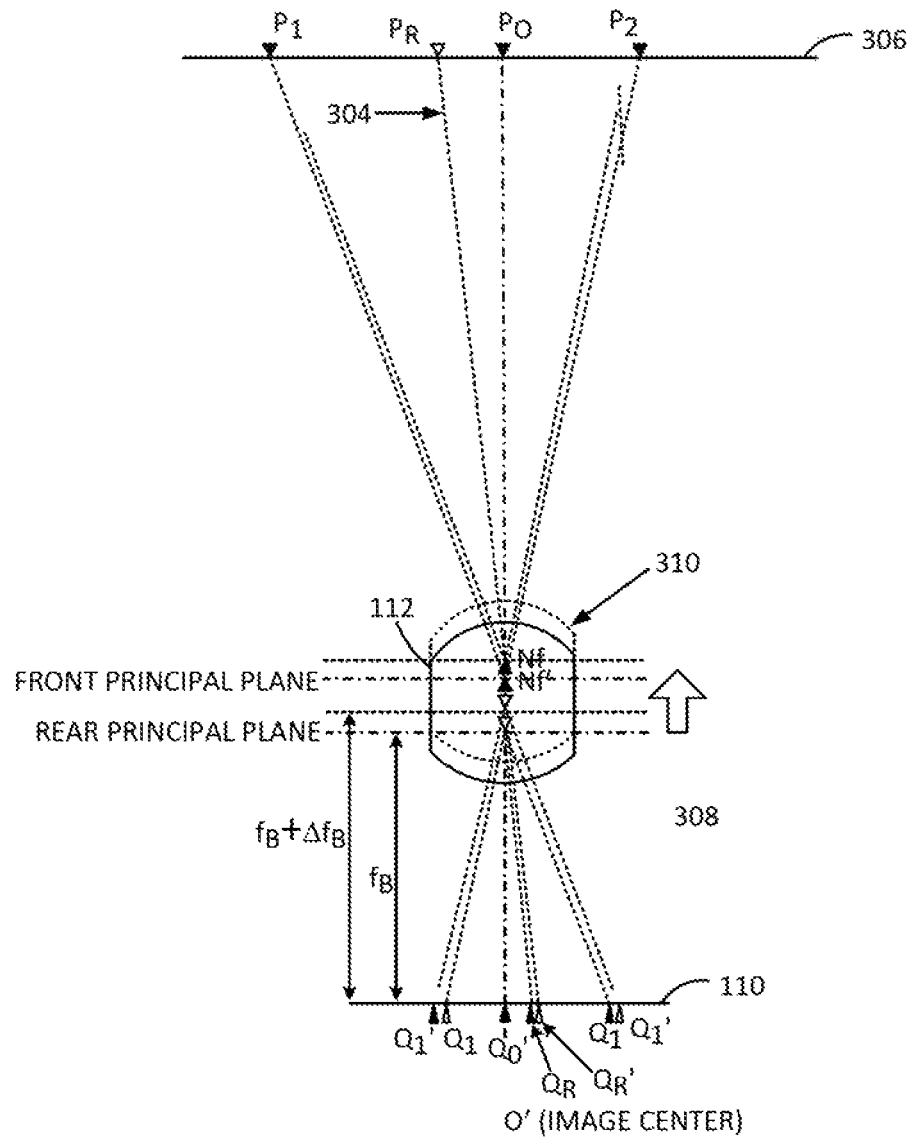
FIG. 3B illustrates an image magnification in more detail.

FIG. 3B illustrates an image magnification in more detail. It should be noted that image magnification has a proportional relationship with image distance (i.e., the distance from the image of a pattern point on the image sensor to the rear nodal point of the lens). In particular, FIG. 3B illustrates an image magnification without a lens shift. Thus, the lens 112 may move closer to or further away from the object 306 (i.e., in a direction parallel to the optical axis of the imaging sensor 110), but does not move laterally (i.e., in a direction perpendicular to the optical axis of the imaging sensor 110, as illustrated in FIG. 3A).

In FIG. 3B, the initial position of the lens 112 is indicated at 308, while the new or magnification positon of the lens 112 is indicated at 310. Reference numeral 304 indicates the reference beam that is projected onto the object 306, creating a point (e.g., dot, x, dash, or the like) image $P_R$, hereinafter referred to as a "reference point," on the object 306. As illustrated, the reference beam 304 is projected from, and passes through, the front nodal point $N_f$ of the lens 112 from the initial position 308. In this case, the front nodal point $N_f$ serves as a calibration position of the distance sensor 100 for triangulation. When the lens 112 moves to the new position 310, the front nodal point of the lens 112 moves to $N_f'$. The rear nodal point of the lens 112 moves from $N_r$ to $N_r'$. The direction and the reference point $P_R$ associated with the reference beam 304 are fixed (i.e., the reference point $P_R$ does not move relative to the object 306 even though the image distance may change).

When the lens 112 is at the initial position 308, the image of the reference point on the imaging sensor 110 is indicated by $Q_R$. As discussed above, the position of the image of the reference point $P_R$ on the object 306 does not move with a change in image distance. However, when the lens 112 shifts to the new position 310 and the image distance is changed (e.g., due to zooming or focusing), the image of the reference point on the imaging sensor 110 moves to $Q_R'$.

In further examples, a plurality of reference beams (i.e., at least two) are used to detect and compensate for lens shift and image magnification. In this case, at least first and second projection points of the distance sensor may be used to project at least first and second reference beams, respectively, onto an object whose distance is being measured.

Figure 4A:
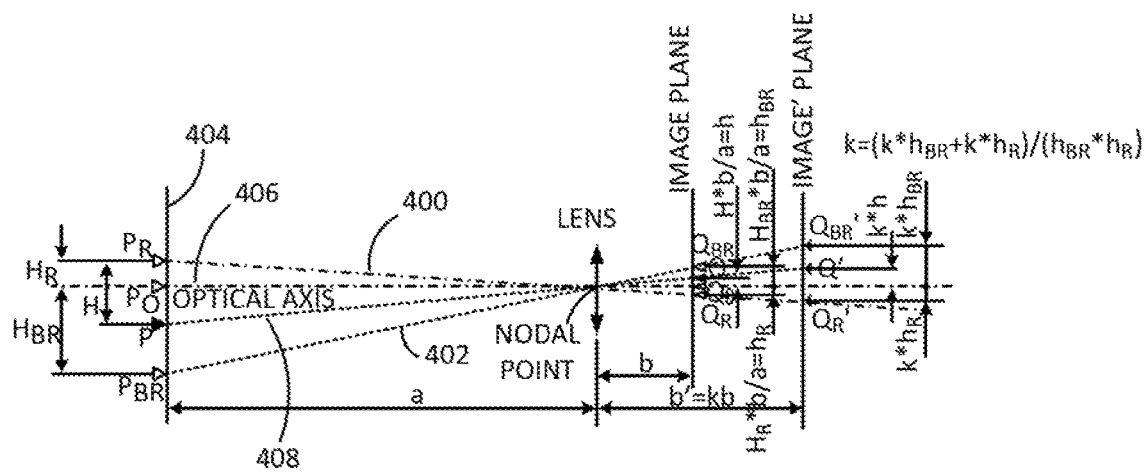
FIG. 4A illustrates a first example in which two reference beams may be used to detect image magnification and/or lens shift.

FIG. 4A, for instance, illustrates a first example in which two reference beams may be used to detect image magnification and/or lens shift. In this case, a variation ratio k may be obtained by detecting the distance variations of the captured images corresponding to both reference beams.

In particular, a first reference beam 400 and a second reference beam 402 are projected to produce a first reference point $P_R$ and a second reference point $P_{SR}$ on an object 404. The positions of the images of the first reference point $P_R$ and the second reference point $P_{SR}$ on the imaging sensor are indicated by $Q_R$ and $Q_{SR}$, respectively; the new positions of the images of the first reference point $P_R$ and the second reference point $P_{SR}$ on the imaging sensor are indicated by $Q_R'$ and $Q_{SR}'$, respectively. The points P and $P_0$ indicate a first measurement point and a second measurement point, respectively, made on the object 404 by a first measurement beam 406 and a second measurement beam 408, respectively.

The variation ratio k in this case may be obtained according to:

$$k = (kh_{SR} + kh_R)/(h_{SR} * h_R) \quad (EQN.\ 2)$$

where $kh_{SR}$ and $kh_R$ are known.

Figure 4B:
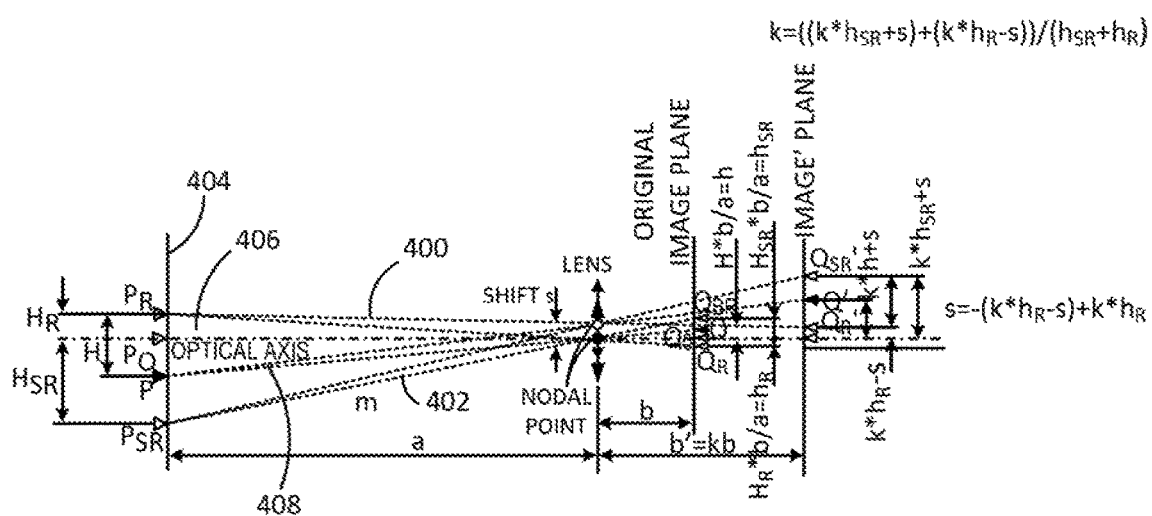
FIG. 4B illustrates an example in which the first and second reference beams of FIG. 4A are used to detect an image magnification and a lens shift that occur simultaneously.

FIG. 4B illustrates an example in which the first and second reference beams 400 and 402 of FIG. 4A are used to detect an image magnification and a lens shift that occur simultaneously. In this case, it is necessary to know the absolute positions (i.e., initial, pre-lens shift positions from which triangulation calibration is performed) of the first and second reference beams 400 and 402 in order to calculate both the shift s and the variation ratio k. The absolute positions in this case are defined as positions against the optical axis A-A' of the imaging sensor, where the optical axis A-A' is further defined as the point at which the images of the reference points do not move with object distance variation or image distance variation.

The accuracy with which the absolute positions needs to be known may vary with conditions. However, in some examples, a calibration means may be employed which is capable of detecting the positions of the first reference beam 400, the second reference beam 402, and the optical axis. The calibration means may further arrange and store the detected positions. The detection, arrangement, and storage of these positions may be performed in connection with a triangulation calibration.

Although the above described examples have been discussed in terms of using reference "beams" to detect lens shift and object distance variations, further examples of the present disclosure may use reference "patterns" created by a plurality of beams to detect lens shift and object distance variations. In this case, at least two projection points of the distance sensor simultaneously project a plurality of beams, which may fan out from the projection point from which they are emitted. Each beam of the plurality of beams may project a point onto an object. The points projected by the plurality of beams may collectively form a plurality of lines on the object (e.g., continuous lines or lines formed by series of dots, dashes, x's, or the like). The space that is bounded by the plurality of beams emitted from a single projection point and by the points that are projected onto the object by the plurality of beams forms a projection plane that may include the front nodal point of the distance sensor's lens. Each projection plane may include the optical axis of the distance sensor.

Figure 5A:
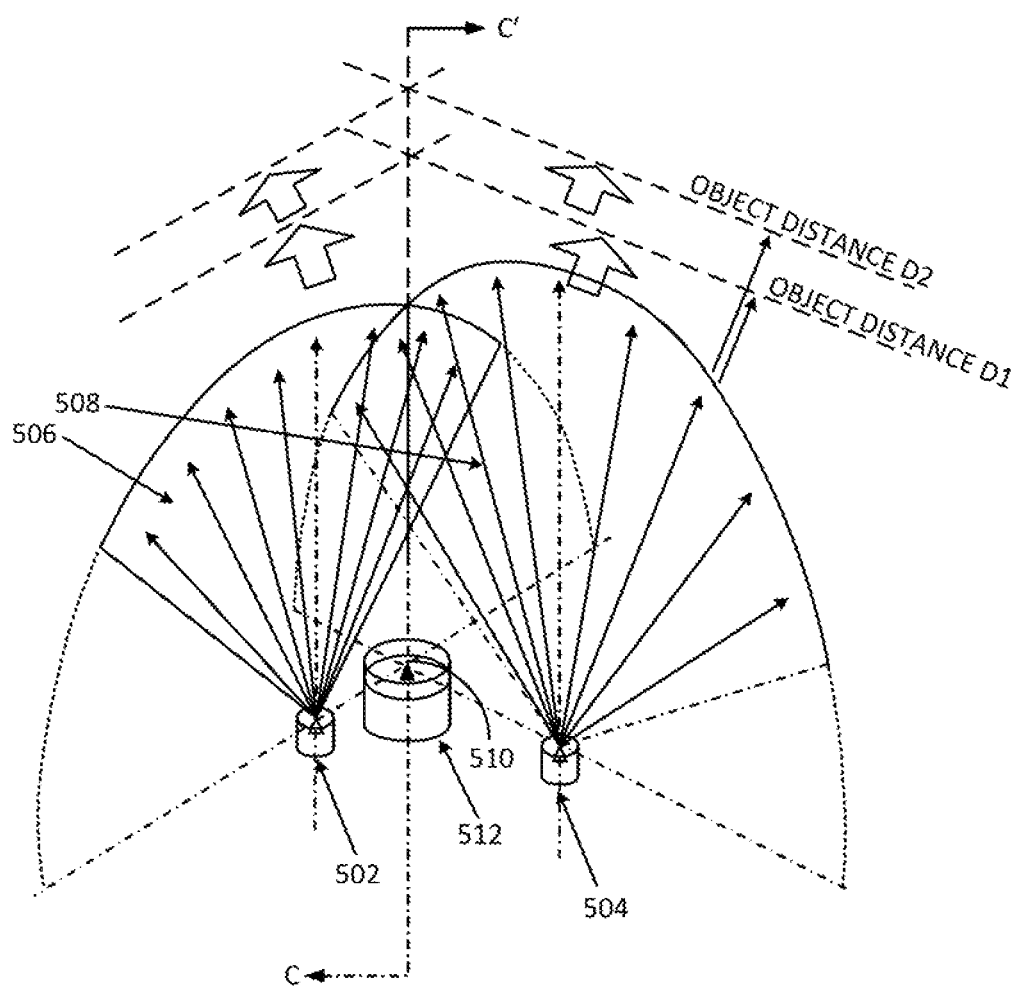
FIG. 5A illustrates a projection of an example primary reference pattern from a first projection point and a second projection point.

FIG. 5A, for instance, illustrates a projection of an example primary reference pattern 500 from a first projection point 502 and a second projection point 504. As illustrated, the first projection point 502 and the second projection point 504 each project a plurality of beams that fans outs to form a first projection plane 506 or a second projection plane 508, respectively.

As illustrated, the first projection plane 506 and the second projection plane 508 intersect along a line C-C' that passes through the front nodal point 510 of the imaging sensor 512. Since the positions of the first projection point 502 and the second projection point 504 are fixed relative to the imaging sensor 512, then the position of the line C-C' along which the first projection plane 506 and the second projection plane 508 intersect is also fixed relative to the imaging sensor 512. Thus, the line C-C' may be considered a "reference beam" which can be recognized practically by capturing an image of the reference pattern 500.

Since the first projection plane 506 and the second projection plane 508 pass the optical axis of the imaging sensor 512, the primary reference pattern 500 created by the first projection plane 506 and the second projection plane 508 may be considered a "primary" reference pattern. The line C-C' may similarly be considered a "primary" reference axis.

Figure 5B:
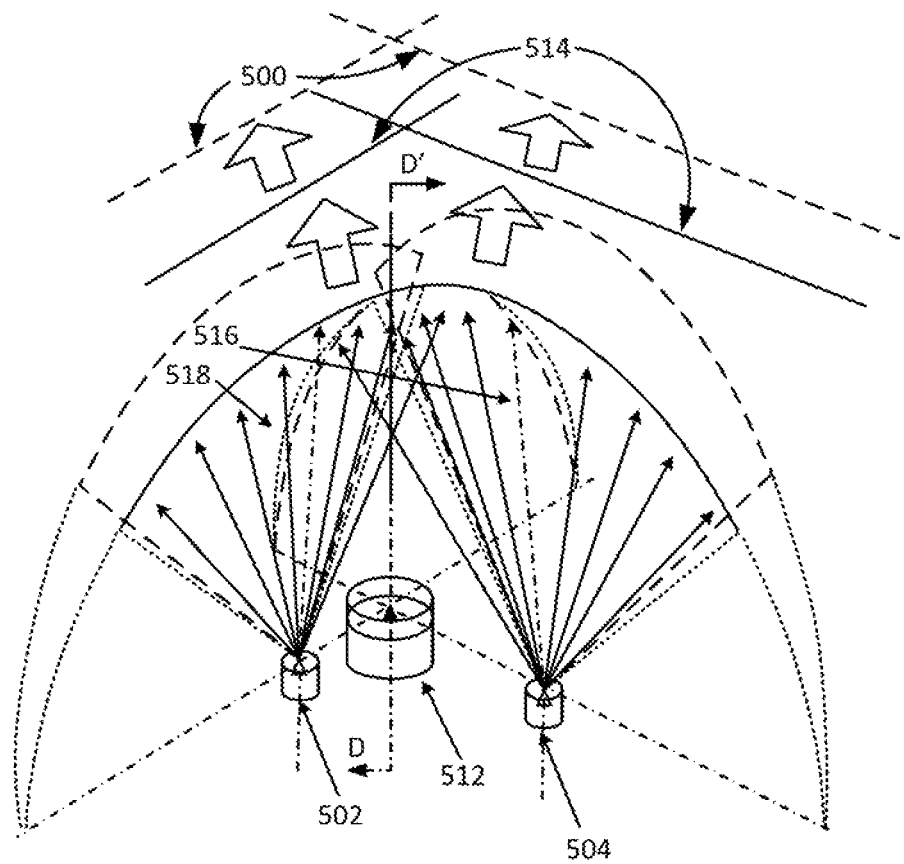
FIG. 5B illustrates a projection of an example secondary reference pattern from the first projection point and the second projection point.

FIG. 5B illustrates a projection of an example secondary reference pattern 514 from the first projection point 502 and the second projection point 504. In this case, the first projection point 502 and the second projection point 504 each project a plurality of beams that fans outs to form a third projection plane 516 or a fourth projection plane 518, respectively.

As illustrated, the third projection plane 516 and the fourth projection plane 518 intersect with a predetermined angle along a line D-D'. Since the positions of the first projection point 502 and the second projection point 504 are fixed relative to the imaging sensor 512, then the position of the line D-D' along which the third projection plane 516 and the fourth projection plane 518 intersect is also fixed relative to the imaging sensor 512. Thus, the line D-D' may be considered a "reference beam" which can be recognized practically by capturing an image of the reference pattern 514.

Since the third projection plane 516 and the fourth projection plane 518 do not pass the optical axis of the imaging sensor 512, the reference pattern 514 created by the third projection plane 516 and the fourth projection plane 518 may be considered a "secondary" reference pattern. The line D-D' may similarly be considered a "secondary" reference axis.

The primary reference pattern 500 and the secondary reference pattern 514 at the same plane are parallel to each other. The distance of the image captured by the imaging sensor 512 between the primary reference pattern 500 and the secondary reference pattern 514 is constant against variation in object distance.

Figure 6A:
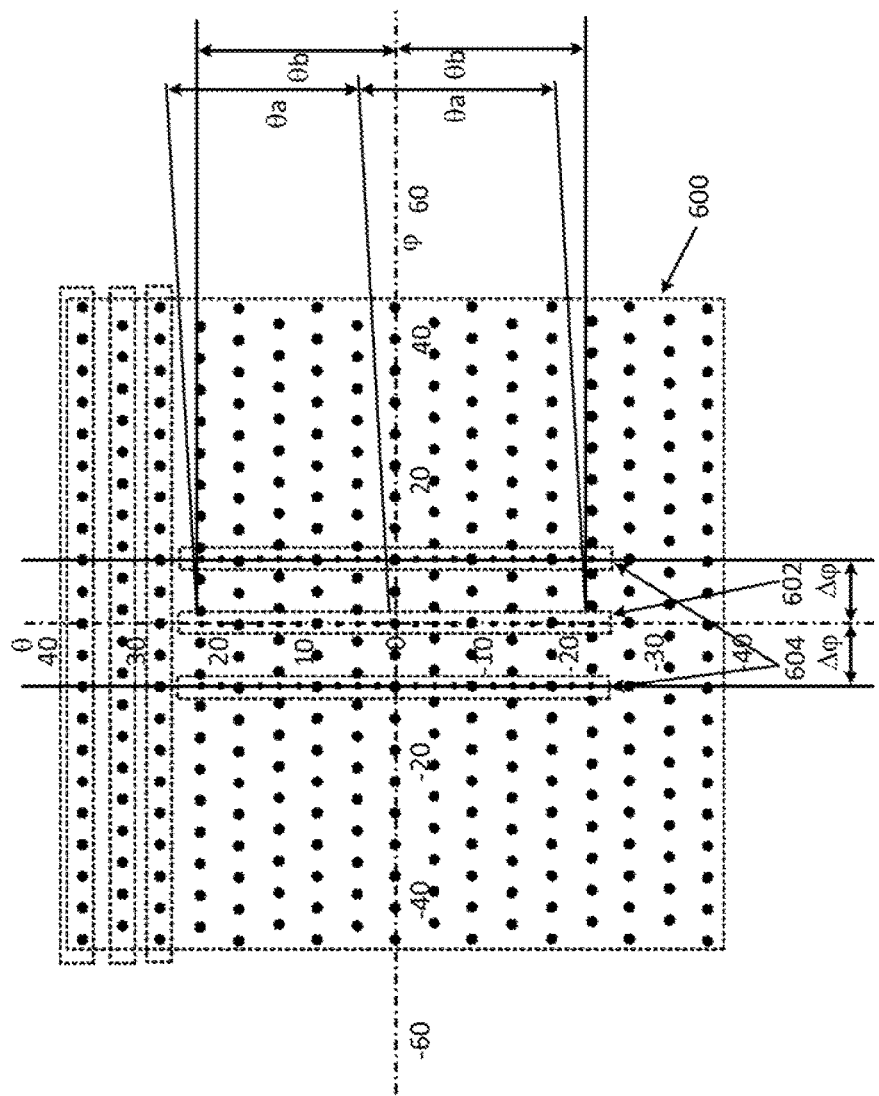
FIGS. 6A and 6B illustrate example primary and secondary reference patterns projected simultaneously.

FIG. 6A illustrates an example measurement pattern 600 that may be projected onto an object by the distance sensor of the present disclosure. As illustrated, the measurement pattern 600 comprises a rectangular matrix of dots. However, in other examples, each column or row of dots may be formed as a continuous line. As discussed above, the measurement pattern 600 is created by at least two projection points, which are located around an imaging sensor and are located at the same height (along a direction of the imaging sensor's optical axis) relative to a front nodal point of the imaging sensor's lens, emitting a plurality of beams simultaneously.

Figure 6B:
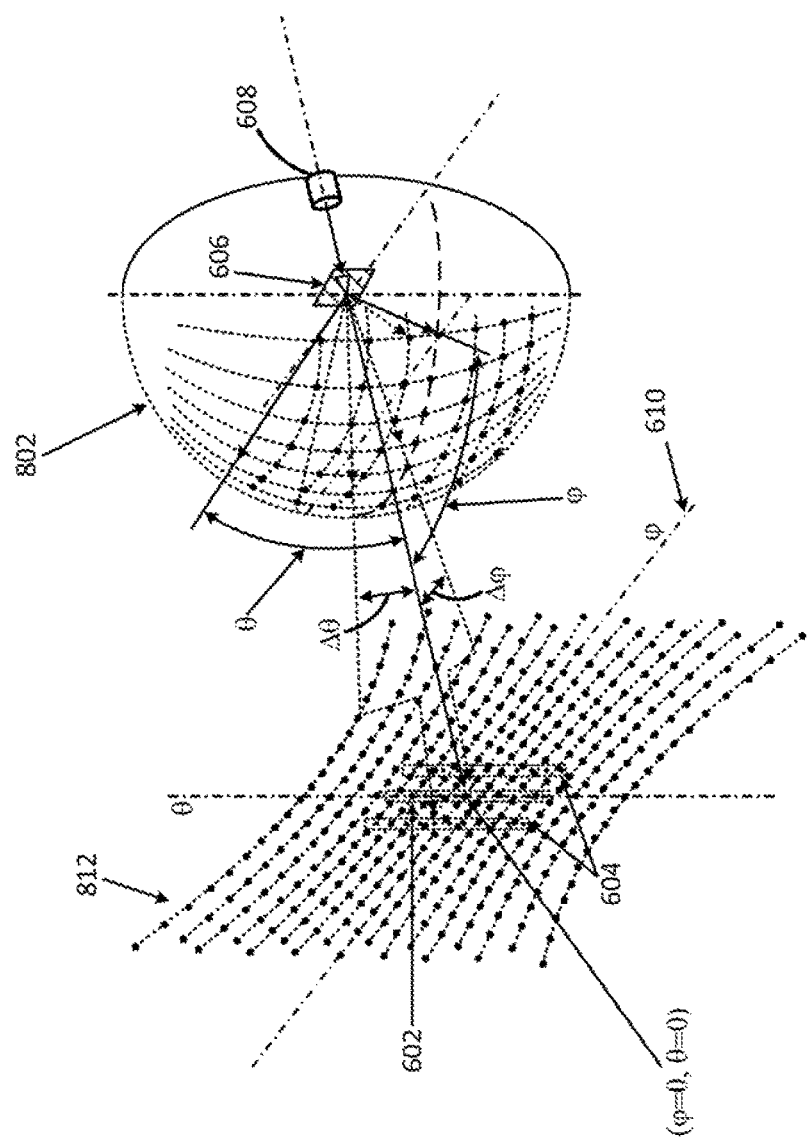

In the example illustrated in FIGS. 6A and 6B, which illustrate example primary and secondary reference patterns projected simultaneously within (or superimposed over) a measurement pattern 600, the primary reference pattern comprises the vertically orientated central line 602 of dots, while the secondary reference pattern comprises a set of vertically orientated lines 604 of dots spaced laterally outward from (and parallel to) the central line 602. The measurement pattern 600, primary reference pattern, and secondary reference pattern are projected into a hemispherical field of view (e.g., a "virtual sphere") from a plurality of projection points 606, which may comprise diffractive optical elements corresponding to respective light sources 608.

More specifically, the primary reference pattern corresponds to the line of $\varphi=C$ (where C is constant, but any value), in spherical coordinates, and more particularly corresponds to the line of $\varphi=0$ (i.e., $C=0$), where $\varphi$ is a rotation angle of the measurement pattern 600. Thus, the primary and secondary reference patterns create planes together with the projection points from which they are projected, and the resultant pattern that is projected onto an object forms a line.

The primary reference pattern may be further defined by an elevation angle $\theta=+\theta a$ to $-\theta a$ (where $\theta$ is any value, and the primary reference pattern is in a predetermined range of $\theta a$ to $\theta b$). The secondary reference pattern may be further defined by an elevation angle $\theta=+\theta b$ to $-\theta b$ (where 0 is any value, and the secondary reference pattern if in a predetermined range of $\theta c$ to $\theta d$). The rotation angle $\varphi$ of the secondary reference pattern may be defined as $\varphi=\Delta\varphi$ (where $\varphi$ is a predetermined value).

By contrast, the measurement pattern 600 corresponds to the line of $\theta=0$ (and, more particularly, a horizontally orientated center line 610 of the measurement pattern 600 corresponds to $\theta=0$), where 0 is an elevation angle of the measurement pattern 600.

Figure 7:
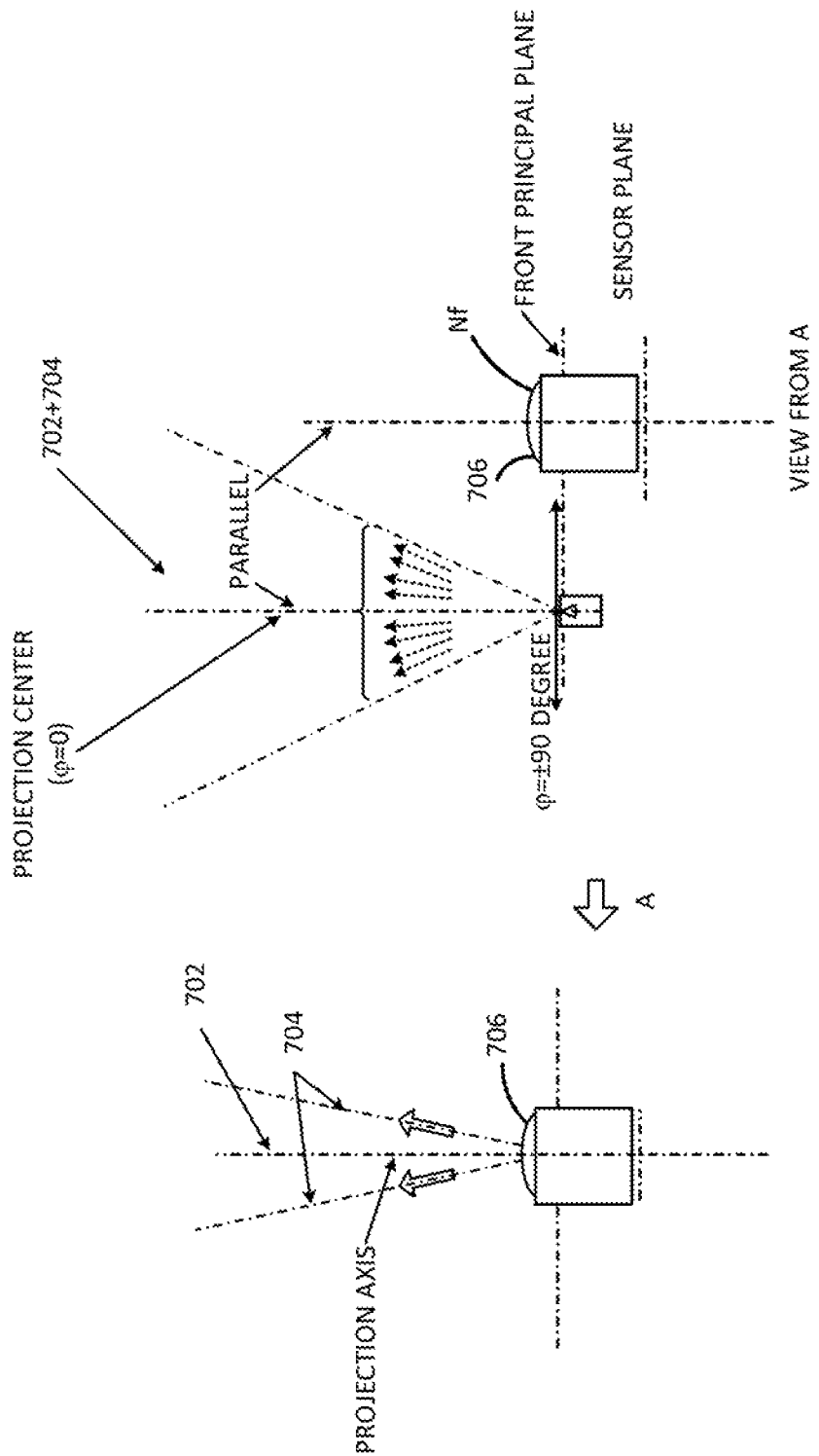
FIG. 7 illustrates a first example side view of the projection of the primary reference pattern and secondary reference pattern of FIGS. 6A and 6.

FIG. 7 illustrates a first example side view of the projection of the primary reference pattern and secondary reference pattern of FIGS. 6A and 6B. As illustrated, the position of a projected point of the reference pattern including the primary reference pattern (projected by beam 702) and the secondary reference pattern (projected by beam 704) is positioned coincident with the front nodal point $N_f$ of the lens 706. Thus, a captured image of a line of the reference pattern occupies the same position at any distance of the lens 706 from the object.

Figure 8:
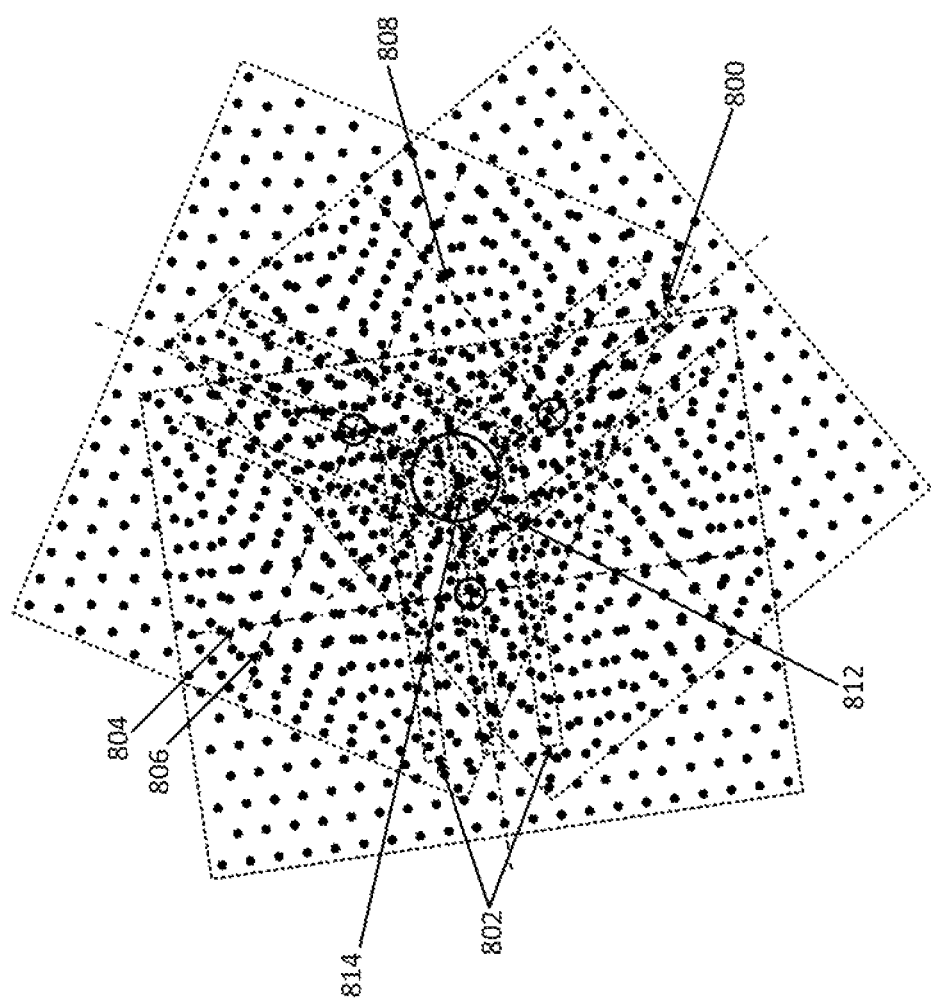
FIG. 8 illustrates an overlap of multiple rectangular matrices of projected dots at different positions.

Thus, by arranging a plurality of projected points as illustrated in FIG. 8, which illustrates an overlap of a primary reference pattern 800 and two secondary reference patterns 802 (which are similarly configured but arranged at different respective positions), the point at which the respective center lines 804, 806, and 808 cross on the optical axis of the imaging sensor's lens 812 is fixed at any distance from the lens 812 to an object upon which the primary reference pattern 800 and secondary reference patterns 804 are projected.

In one example, the primary reference pattern 800 is configured so that its cross points can be easily recognized. However, it can be assumed that some portion of the primary reference pattern 800 may become undetectable due to point image conditions (depending on object conditions such as abnormal reflection conditions, the existence of an obstacle, etc.). Thus, over time, the accuracy of the distance sensors ability to detect the primary reference pattern 800 over time may vary.

Thus, in one example, safeguards may be taken to improve the accuracy with which the cross points of the primary reference pattern 800 are recognized. For instance, the number of projected lines in the primary reference pattern 800 may be increased (e.g., to four or more) and/or the lengths of the projected lines may be increased. In further examples, a selection means may be used to select the most effective portions of the primary reference pattern 800 and the most effective calculation means based on the selected portion of the primary reference pattern 800. In further examples still, a control means may be used to control the projection and image capture of the primary reference pattern 800 (e.g., the time of emission, intensity of emission, time of exposure, image subtraction manner, or the like) based on an analysis of pattern conditions and/or triangulation results.

Figure 9:
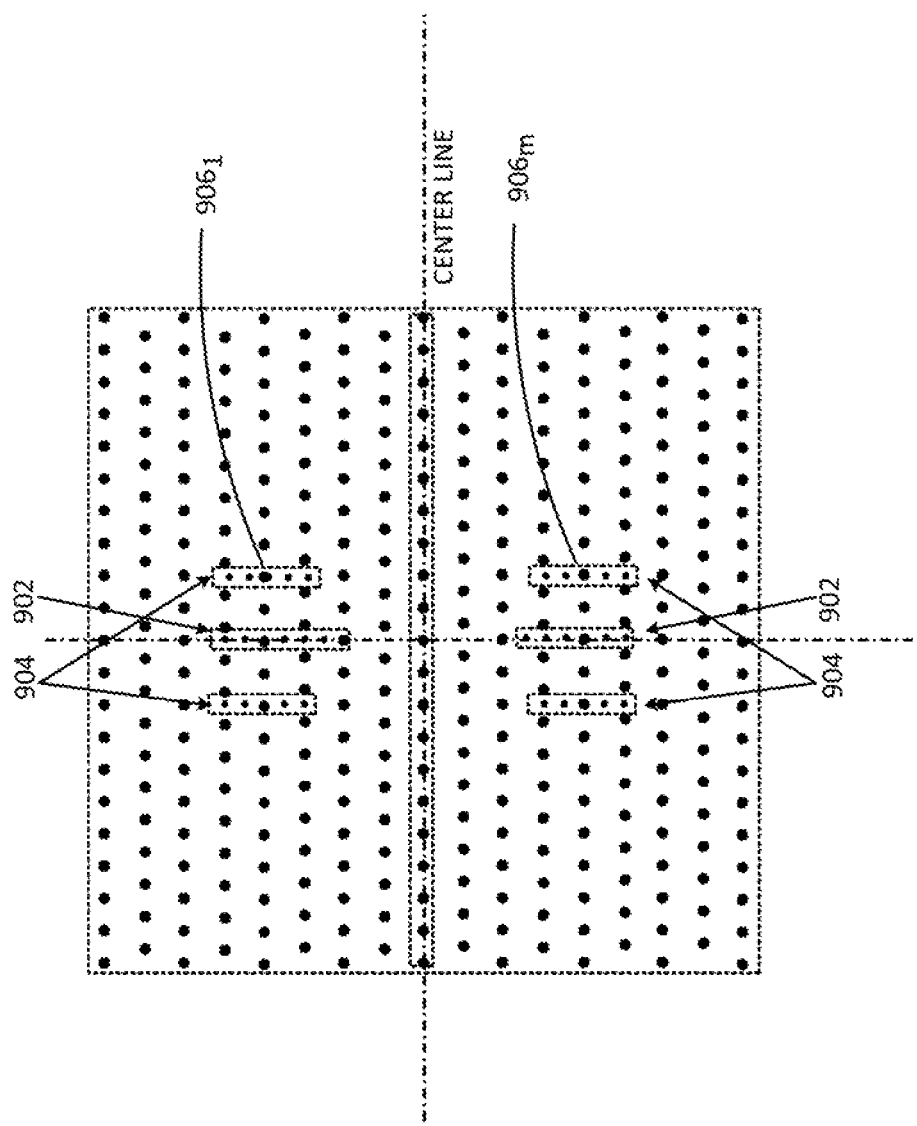
FIG. 9 illustrates an example measurement pattern having a primary reference pattern and a secondary reference pattern projected simultaneously therewith.

FIG. 9 illustrates an example measurement pattern 900 having a primary reference pattern 902 and a secondary reference pattern 904 projected simultaneously therewith. As illustrated, the measurement pattern 900 has a relatively simple shape comprised of a regular pattern of straight lines (where each line is formed in this case as a series of dots). Thus, the shape of the entire measurement pattern 900 can be easily assume from even a partial view of the measurement pattern 900.

However, the reference pattern, comprised collectively of the primary reference pattern 902 and the secondary reference pattern 904 which are superimposed over the measurement pattern 900, may interfere with the function of the measurement pattern 900 if the measurement pattern 900 and the primary and secondary reference patterns 902 and 904 are projected from the same projection point of the distance sensor. Thus, in one example, the reference pattern may be broken up into a plurality of segments $906_1$-$906_m$ (hereinafter collectively referred to as "segments 906" or individually referred to as a "segment 906").

Further examples of the present disclosure provide a zooming three-dimensional distance sensor. For far distances, the moving value of a projected point image is small. However, by zooming in (i.e., decreasing the distance from the lens to the object), the moving value of the point image is increased, and distance sensitivity improves.

For measuring far distances, as lens brightness decreases, the intensity of the return light (i.e., the light reflected by the object and returned back to the imaging sensor) also decreases. Thus, the intensity of the light emitted by the light sources may be increased. On the other hand, increasing the intensity of the emitted light may introduce some disadvantages, such as increased power consumption, decreased lifespan, and decreased safety.

Thus, a control means may be employed to synchronize with the zooming function. The control means may select a specific projection pattern, adjust light source intensity, adjust the emission time and/or intervals of light source pulses, and adjust the capture functions of the imaging sensor (e.g., shutter speed, exposure timing, etc.).

Additionally, image blur may vary with focal adjustments and may also affect the accuracy of distance measurement. As the distance sensor zooms in (i.e., image magnification increases), the effect of image blur may become more severe. Since the distance sensor needs to measure distances in a broad range, any auto focusing system should focus on a full range of distances at any time. A focus changing system with a cyclic pattern may thus be employed, where the cyclic pattern changes with image magnification/zoom value.

Further examples of the present disclosure may compensate for lens and other imaging optics aberrations that vary with lens movement. In one example, this is done by employing a process that stores calibrated compensation values and adjusts three-dimensional measurement results using the calibrated compensation values corresponding to the measured distance.

Figure 10:
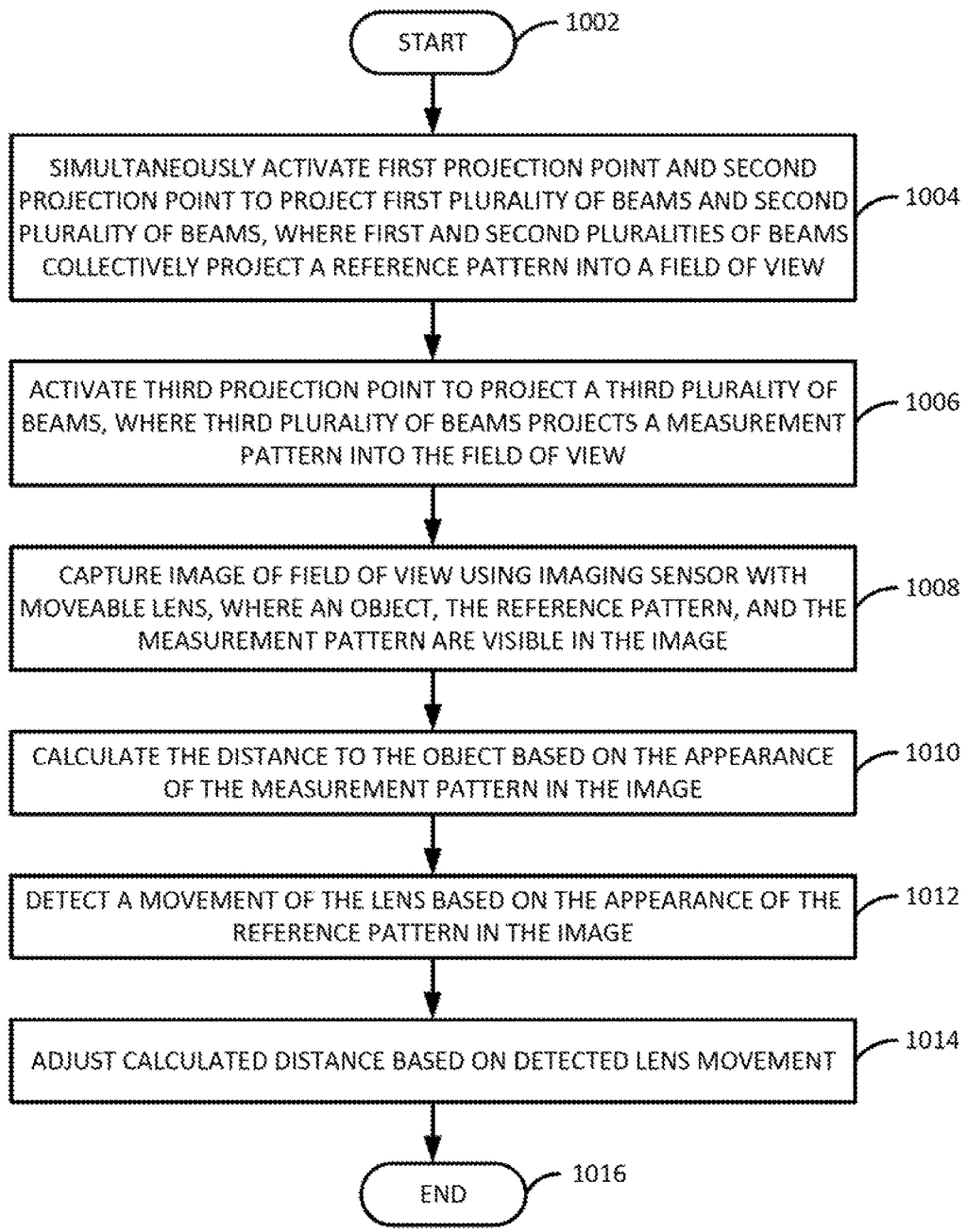
FIG. 10 illustrates a flowchart of a method for calculating the distance from a sensor to an object or point in space.
Figure 11:
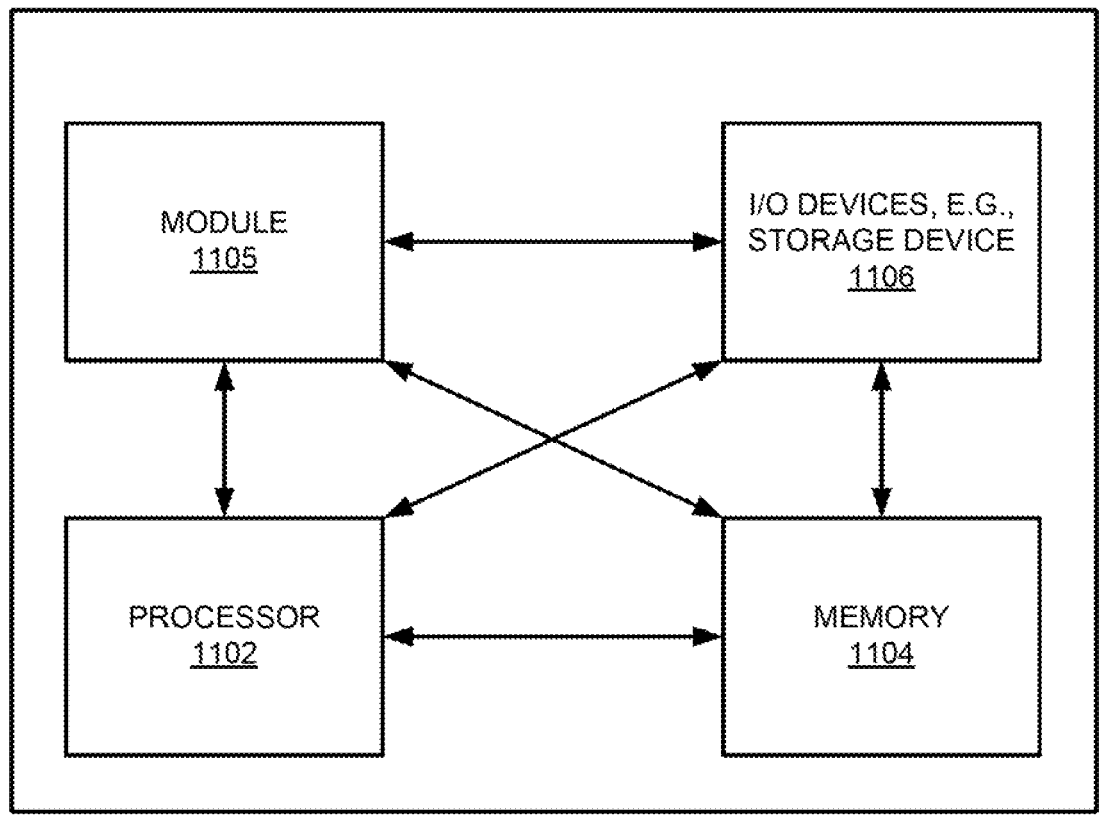
FIG. 11 depicts a high-level block diagram of a general-purpose computer suitable for use in performing the functions described herein.

FIG. 10 illustrates a flowchart of a method 1000 for calculating the distance from a sensor to an object or point in space. In one embodiment, the method 1000 may be performed by a processor integrated in an imaging sensor (such as the imaging sensor 110 illustrated in FIGS. 1A-1B) or a general purpose computing device as illustrated in FIG. 11 and discussed below.

The method 1000 begins in step 1002. In step 1004, a first projection point and a second projection point of a distance sensor are simultaneously activated to project first and second pluralities of beams, respectively. Collectively, the first and second pluralities of beams project a reference pattern into a field of view. As discussed above, the reference pattern may comprise a primary reference pattern and a secondary reference pattern, where the primary reference pattern comprises a first line and the secondary reference pattern comprises second and third lines orientated parallel to the first line. For instance, the first line may be orientated parallel to an optical axis of an imaging sensor of the distance sensor, while the second line and third line are orientated at an angle relative to a plane of the first line.

Any of the first, second, and third lines may be formed as a series of points (e.g., dots, dashes, x's, or the like). The first, second, and third lines may form respective first, second, and third planes with a fixed point of the imaging sensor (e.g., a front nodal point of the imaging sensors lens).

As discussed above, a rotation angle of the primary reference pattern may be zero in spherical coordinates, and an elevation angle of the primary reference pattern may fall within a predetermined range in the spherical coordinates. At the same time, a rotation angle of the secondary reference pattern may be a constant value in the spherical coordinates, and an elevation angle of the secondary reference pattern may fall within a predetermined range in the spherical coordinates.

In step 1006, a third projection point of the distance sensor is activated to project a third plurality of beams. The third plurality of beams projects a measurement pattern into the field of view. In one example, the first and/or second plurality of beams projected by the first and/or second projection point may cooperate with the third plurality of beams to form the reference pattern. As discussed above, the measurement pattern may comprise a plurality of parallel lines, where each line of the plurality of parallel lines is formed as a series of points (e.g., dots, dashes, x's, or the like). Thus, in one example, the measurement pattern may comprise a rectangular matrix of dots. In one example, the first, second, and third lines of the reference pattern are orientated parallel to, but superimposed over, the plurality of parallel lines of the measurement pattern.

As discussed above, a rotation angle of the measurement pattern may fall within a predetermined range in the spherical coordinates, and an elevation angle of the measurement pattern may be a constant value in the spherical coordinates.

In step 1008, an image of the field of view is captured, e.g., by the imaging sensor, where the positions of the first, second, and third projection points are fixed relative to a position of the imaging sensor. The object, the reference pattern, and the measurement pattern are visible in the image. The imaging sensor may include a focusing function and/or a focal length changing function. Thus, the imaging sensor's lens may be moveable.

In step 1010, a distance from the distance sensor to the object is calculated based on an appearance of the measurement pattern in the image. In one example, the distance is calculated using a triangulation algorithm.

In step 1012, a movement of a lens of the imaging sensor is detected based on an appearance of the reference pattern in the image. For instance, based on the appearance of a fixed direction of the reference pattern relative to a fixed point of the imaging sensor (e.g., a front nodal point of the imaging sensor's lens), it may be determined that the lens has shifted laterally relative to a direction of the imaging sensor's optical axis, or that the lens has moved closer to or further away from the object. The movement is relative to an initial (e.g., calibrated) position of the lens.

For instance, the movement of the lens may be detected by detecting an initial position of a cross point of the primary reference pattern with the secondary reference pattern. The initial pattern may be stored relative to a predetermined (e.g., calibrated) position of the lens. A current position of the cross point may then be detected, and a difference may be calculated between the initial point and the current point to find the amount of the lens movement. In a further example, an initial distance and a current distance between the first reference pattern and the second reference pattern may also be detected, and a difference between the initial distance and the current distance may indicate an amount of lens movement.

In step 1014, the distance calculated in step 1010 is adjusted based on the movement detected in step 1012. Thus, the distance calculation may be adjusted to compensate for lens movement (shift, zoom, incline, or the like).

The method 1000 then ends in step 1016.

FIG. 11 depicts a high-level block diagram of a general-purpose computer suitable for use in performing the functions described herein. As depicted in FIG. 11, the system 1100 comprises one or more hardware processor elements 1102 (e.g., a central processing unit (CPU), a microprocessor, or a multi-core processor), a memory 1104, e.g., random access memory (RAM) and/or read only memory (ROM), a module 1105 for calculating distance, and various input/output devices 1106 (e.g., storage devices, including but not limited to, a tape drive, a floppy drive, a hard disk drive or a compact disk drive, a receiver, a transmitter, a lens and optics, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 1105 for calculating distance (e.g., a software program comprising computer-executable instructions) can be loaded into memory 1104 and executed by hardware processor element 1102 to implement the steps, functions or operations as discussed above in connection with the example method 1000. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 1105 for calculating distance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for calculating a distance to an object, the method comprising:
   simultaneously activating a first projection point and a second projection point of a distance sensor to collectively project a reference pattern into a field of view;
   activating a third projection point of the distance sensor to project a measurement pattern into the field of view;
   capturing an image of the field of view, wherein the object, the reference pattern, and the measurement pattern are visible in the image;
   calculating a distance from the distance sensor to the object based on an appearance of the measurement pattern in the image;
   detecting a movement of a lens of the distance sensor based on an appearance of the reference pattern in the image; and
   adjusting the distance as calculated based on the movement as detected.

2. The method of claim 1, wherein the reference pattern comprises a first line, a second line, and a third line that are positioned parallel to each other.

3. The method of claim 2, wherein each of the first line, the second line, and the third line is formed from a respective series of dots.

4. The method of claim 1, wherein the movement is detected based on a fixed direction of the reference pattern against a fixed point of an imaging sensor used to capture the image.

5. The method of claim 4, wherein each of the first line, the second line, and the third line forms a plane with the fixed point of the imaging sensor.

6. The method of claim 4, wherein the fixed point of the imaging sensor comprises a front nodal point of the lens.

7. The method of claim 4, wherein each of the first line, the second line, and the third line forms a plane that includes an optical axis of the imaging sensor.

8. The method of claim 2, wherein the first line comprises a primary reference pattern, and the second line and third line collectively comprise a secondary reference pattern, wherein the primary reference pattern is orientated parallel to an optical axis of an imaging sensor of the distance sensor, and wherein the secondary reference pattern is orientated at an angle relative to a plane of the primary reference pattern.

9. The method of claim 8, wherein a rotation angle of the primary reference pattern is zero in spherical coordinates, and an elevation angle of the primary reference pattern falls within a predetermined range in the spherical coordinates.

10. The method of claim 9, wherein a rotation angle of the secondary reference pattern is a constant value in the spherical coordinates, and an elevation angle of the secondary reference pattern falls within a predetermined range in the spherical coordinates.

11. The method of claim 10, wherein a rotation angle of the measurement pattern falls within a predetermined range in the spherical coordinates, and an elevation angle of the measurement pattern is a constant value in the spherical coordinates.

12. The method of claim 8, wherein the detecting comprises:
   detecting an initial position of a cross point of the primary reference pattern with the secondary reference pattern;
   storing the initial position relative to a predetermined position of the lens;
   detecting a current position of the cross point; and
   calculating a difference between the initial position and the current position to find an amount of the movement.

13. The method of claim 12, further comprising:
   detecting an initial distance between the first reference pattern and the second reference pattern;
   storing the initial distance relative to the predetermined position of the lens;
   detecting a current distance between the first reference pattern and the second reference pattern; and
   calculating a difference between the initial distance and the current distance to find an amount of the movement.

14. The method of claim 1, wherein at least one of the first projection point and the second projection point cooperates with the third projection point to project the measurement pattern.

15. The method of claim 1, wherein the movement is a shift in a direction perpendicular to an optical axis of an imaging sensor of the distance sensor.

16. The method of claim 1, wherein the movement is in a direction parallel to an optical axis of an imaging sensor of the distance sensor.

17. The method of claim 1, wherein respective positions of the first projection point, the second projection point, and the third projection point are fixed around an imaging sensor that performs the capturing.

18. The method of claim 1, wherein the imaging sensor includes a focusing function.

19. The method of claim 1, wherein the imaging sensor includes a focal length changing function.

20. A non-transitory computer-readable storage device storing a plurality of instructions which, when executed by a processor, cause the processor to perform operations for calculating a distance to an object, the operations comprising:
   simultaneously activating a first projection point and a second projection point of a distance sensor to collectively project a reference pattern into a field of view;
   activating a third projection point of the distance sensor to project a measurement pattern into the field of view;
   capturing an image of the field of view, wherein the object, the reference pattern, and the measurement pattern are visible in the image;
   calculating a distance from the distance sensor to the object based on an appearance of the measurement pattern in the image;
   detecting a movement of a lens of the distance sensor based on an appearance of the reference pattern in the image; and
   adjusting the distance as calculated based on the movement as detected.

21. An apparatus, comprising:
   an imaging sensor including a lens that is movable;
   a first projection point and a second projection point to collectively project a reference pattern into a field of view, wherein respective positions of the first projection point and the second projection point relative to the imaging sensor are fixed;
   a third projection point to project a measurement pattern into the field of view, wherein a position of the third projection point relative to the imaging sensor is fixed; and
   circuitry to calculate a distance from the apparatus an object in the field of view based on an appearance of the measurement pattern in an image of the field of view captured by the imaging sensor, to detect a movement of the lens based on an appearance of the reference pattern in the image, and to adjust the distance as calculated based on the movement as detected.

* * * * *